United States Patent
Gruber

(10) Patent No.: US 12,555,450 B2
(45) Date of Patent: Feb. 17, 2026

(54) PERSON DETECTION APPARATUS AND METHOD

(71) Applicant: Universal Electronics Inc., Scottsdale, AZ (US)

(72) Inventor: Brandon Gruber, Carlsbad, CA (US)

(73) Assignee: Universal Electronics Inc., Scottsdale, AZ (US)

(*) Notice: Subject to any disclaimer, the term of this patent is extended or adjusted under 35 U.S.C. 154(b) by 278 days.

(21) Appl. No.: 17/393,928

(22) Filed: Aug. 4, 2021

(65) Prior Publication Data
US 2021/0366253 A1 Nov. 25, 2021

Related U.S. Application Data

(62) Division of application No. 16/811,833, filed on Mar. 6, 2020, now Pat. No. 11,113,939.

(51) Int. Cl.
| | |
|---|---|
| *G08B 13/196* | (2006.01) |
| *H04L 12/28* | (2006.01) |
| *H05B 47/175* | (2020.01) |
| *H05B 47/19* | (2020.01) |

(52) U.S. Cl.
CPC . *G08B 13/19652* (2013.01); *G08B 13/19634* (2013.01); *G08B 13/1966* (2013.01); *G08B 13/19673* (2013.01); *H04L 12/2809* (2013.01); *H05B 47/19* (2020.01); *H05B 47/1965* (2024.01)

(58) Field of Classification Search
CPC ........ G08B 13/19652; G08B 13/19634; G08B 13/1966; G08B 13/19673; H04L 12/2809
See application file for complete search history.

(56) References Cited

U.S. PATENT DOCUMENTS

| | | | |
|---|---|---|---|
| 5,196,826 A | 3/1993 | Whiting | |
| 5,344,068 A * | 9/1994 | Haessig | F24F 11/00 236/47 |
| 5,543,778 A | 8/1996 | Stouffer | |
| 5,903,217 A | 5/1999 | Stanczak et al. | |
| 5,986,357 A | 11/1999 | Myron et al. | |
| 6,057,764 A | 5/2000 | Williams | |
| 6,850,159 B1 * | 2/2005 | Mudge | H05B 47/115 340/541 |
| 6,909,921 B1 | 6/2005 | Bilger | |
| 7,411,789 B2 | 8/2008 | Elwell et al. | |
| 7,636,039 B2 | 12/2009 | Babich | |
| 7,873,849 B2 | 1/2011 | Mucignat et al. | |
| 8,432,287 B2 | 4/2013 | O'Keefe | |
| 8,665,090 B2 | 3/2014 | Bull | |

(Continued)

FOREIGN PATENT DOCUMENTS

WO 2018141946 A1 8/2018

OTHER PUBLICATIONS

U.S. Patent and Trademark Office, Non-Final Office Action issued in U.S. Appl. No. 17/963,708, dated Feb. 16, 2023, 11 pgs.

(Continued)

*Primary Examiner* — Francis Geroleo
(74) *Attorney, Agent, or Firm* — Greenberg Traurig, LLP

(57) ABSTRACT

A system, method and apparatus for detecting the presence of a person in an area monitored by an electronic person detector that may operate both as a security motion sensor and a home automation occupancy sensor.

14 Claims, 8 Drawing Sheets

(56) References Cited

U.S. PATENT DOCUMENTS

| | | | |
|---|---|---|---|
| 8,842,008 | B2 | 9/2014 | Bull |
| 9,589,446 | B1 | 3/2017 | Dey |
| 9,615,428 | B2 | 4/2017 | King |
| 9,717,131 | B2 | 7/2017 | Eskonen |
| 9,756,607 | B1 | 9/2017 | DeLuca |
| 9,836,069 | B1 | 12/2017 | Nelmes et al. |
| 10,257,397 | B2 | 4/2019 | Ando |
| 10,354,503 | B1 | 7/2019 | Kostrun et al. |
| 10,492,261 | B2 | 11/2019 | Chen |
| 10,557,965 | B2 | 2/2020 | Lemarchand |
| 10,650,652 | B1 * | 5/2020 | Weingart ......... G08B 13/19645 |
| 10,657,784 | B1 | 5/2020 | Gordon |
| 10,937,257 | B2 | 3/2021 | Davidson et al. |
| 10,948,965 | B2 | 3/2021 | Gruber |
| 11,113,939 | B1 | 9/2021 | Gruber |
| 11,227,476 | B2 * | 1/2022 | Pradhan ................. G08B 13/19 |
| 11,232,685 | B1 * | 1/2022 | Nixon .................... H04N 23/60 |
| 11,262,244 | B2 | 3/2022 | Moore |
| 11,474,586 | B2 | 10/2022 | Gruber |
| 11,650,102 | B2 | 5/2023 | Gruber |
| 11,680,960 | B2 | 6/2023 | Zhevelev |
| 11,836,030 | B2 | 12/2023 | Gruber |
| 11,900,781 | B2 | 2/2024 | Pradhan |
| 12,323,914 | B2 | 6/2025 | Gruber |
| 2002/0067272 | A1 | 6/2002 | Lemelson et al. |
| 2002/0089489 | A1 | 7/2002 | Carpenter |
| 2002/0175815 | A1 | 11/2002 | Baldwin |
| 2004/0090327 | A1 | 5/2004 | Soloway |
| 2005/0228317 | A1 | 10/2005 | Mathews |
| 2006/0125621 | A1 | 6/2006 | Babich |
| 2008/0291036 | A1 | 11/2008 | Richmond |
| 2009/0086683 | A1 | 4/2009 | Pendergrass et al. |
| 2009/0146846 | A1 | 6/2009 | Grossman |
| 2009/0196206 | A1 | 8/2009 | Weaver et al. |
| 2010/0019911 | A1 | 1/2010 | Chen |
| 2012/0019644 | A1 | 1/2012 | Hamabashiri et al. |
| 2012/0023354 | A1 | 1/2012 | Chino |
| 2012/0025991 | A1 | 2/2012 | O'Keefe |
| 2012/0143357 | A1 | 6/2012 | Chemel |
| 2012/0147537 | A1 | 6/2012 | Burgess |
| 2012/0297226 | A1 | 11/2012 | Mucignat et al. |
| 2012/0315839 | A1 | 12/2012 | Mumcuoglu et al. |
| 2013/0267253 | A1 | 10/2013 | Case et al. |
| 2014/0062692 | A1 | 3/2014 | Li |
| 2014/0118592 | A1 | 5/2014 | Yoon et al. |
| 2014/0191862 | A1 | 7/2014 | Haines |
| 2015/0113338 | A1 | 4/2015 | Maruyama et al. |
| 2015/0127662 | A1 | 5/2015 | Yi |
| 2015/0308706 | A1 | 10/2015 | Bunker et al. |
| 2015/0382432 | A1 | 12/2015 | Eskonen |
| 2016/0003493 | A1 | 1/2016 | Katz |
| 2016/0062443 | A1 | 3/2016 | Saito |
| 2016/0095192 | A1 | 3/2016 | Vangeel et al. |
| 2016/0126733 | A1 | 5/2016 | Hick et al. |
| 2016/0150121 | A1 | 5/2016 | Idehara |
| 2016/0195924 | A1 | 7/2016 | Weber |
| 2016/0241997 | A1 | 8/2016 | Lucas |
| 2016/0291966 | A1 | 10/2016 | Johnson |
| 2017/0013069 | A1 | 1/2017 | Grohman |
| 2017/0039844 | A1 | 2/2017 | Malhotra |
| 2017/0060960 | A1 | 3/2017 | Kim et al. |
| 2017/0092112 | A1 * | 3/2017 | Khazanov ............ G08B 25/008 |
| 2017/0160428 | A1 | 6/2017 | Kumar |
| 2017/0181249 | A1 | 6/2017 | Takahashi |
| 2017/0289469 | A1 | 10/2017 | Ando |
| 2017/0316680 | A1 | 11/2017 | Lamb et al. |
| 2017/0358182 | A1 | 12/2017 | El-Iraki et al. |
| 2018/0012467 | A1 | 1/2018 | Chen |
| 2018/0074152 | A1 | 3/2018 | Bowden |
| 2018/0268673 | A1 | 9/2018 | Amir |
| 2018/0322752 | A1 | 11/2018 | Chen |
| 2018/0338472 | A1 | 11/2018 | Kinsley |
| 2019/0141812 | A1 | 5/2019 | Chen |
| 2019/0293315 | A1 | 9/2019 | Ruiz |
| 2020/0209943 | A1 | 7/2020 | Gruber et al. |
| 2020/0211340 | A1 | 7/2020 | Min |
| 2020/0294382 | A1 | 9/2020 | Pradhan et al. |
| 2020/0333868 | A1 | 10/2020 | Gruber |
| 2021/0278890 | A1 | 9/2021 | Gruber |
| 2021/0280029 | A1 | 9/2021 | Gruber |
| 2021/0366253 | A1 | 11/2021 | Gruber |
| 2022/0139189 | A1 | 5/2022 | Pradhan et al. |
| 2023/0021573 | A1 | 1/2023 | Gruber |
| 2023/0029713 | A1 | 2/2023 | Gruber et al. |
| 2024/0310214 | A1 | 9/2024 | Sehlhoff |
| 2024/0429727 | A1 | 12/2024 | Honma |

OTHER PUBLICATIONS

EPO, extended European search report issued on European patent application No. 20770681.3, dated Nov. 7, 2022, 7 pgs.

ISA/US, International Search Report and Written Opinion issued on PCT application No. US22/37533, dated Aug. 16, 2022, 8 pages.

ISA/US, Int. Search Report and Written Opinion issued on PCT application No. PCT/US19/57130, dated Jan. 16, 2020, 10 pages.

ISA/US, Int. Search Report and Written Opinion issued on PCT application No. PCT/US17/54706, dated Oct. 19, 2017, 9 pages.

ISA/US, Int. Search Report and Written Opinion issued on PCT application No. PCT/US21/19185, dated Mar. 26, 2021, 7 pages.

ISA/US, Int. Sear Report and Written Opinion issued on PCT application No. PCT/US20/21177, dated Jun. 15, 2020, 13 pages.

Extended Search Report from European application No. 21765088.6, dated Jun. 28, 2023, 7 pp.

Final Office Action in U.S. Appl. No. 17/578,112, mailed Jun. 23, 2023, 12 pp.

Non-final Office Action from U.S. Appl. No. 17/578,112, mailed Dec. 22, 2022, 15 pp.

Notice of Allowance from U.S. Appl. No. 17/963,708, mailed Jul. 25, 2023, 9 pp.

Non-final Office Action from U.S. Appl. No. 18/307,970, dated Mar. 28, 2024, 12 pp.

Non-final Office Action from U.S. Appl. No. 18/505,270, dated Jun. 5, 2024, 10 pp.

Office Action from European application No. 19907204.2, dated Aug. 22, 2023, 6 pp.

Office Action from European application No. 20770681.3, dated Aug. 21, 2023, 7 pp.

Office Action from European application No. 20770681.3, dated Mar. 21, 2024, 6 pp.

Extended Search Report from European application number 22846483.0, dated Sep. 13, 2024, 9 pp.

Extended Search Report from European application No. 24176885.2, dated Jul. 5, 2024, 12 pp.

Final Office Action from U.S. Appl. No. 18/428,481, dated May 14, 2025, 22 pp.

Non-final Office Action from U.S. Appl. No. 18/428,481, dated Sep. 16, 2024, 20 pp.

Office Action from EP application number 19907204.2, dated Jul. 31, 2024, 10 pp.

Office Action from European application No. 20770681.3, dated Sep. 11, 2024, 6 pp.

Non-final Office Action from U.S. Appl. No. 18/641,888 dated Oct. 3, 2025, 10 pp.

* cited by examiner

PERSON DETECTION APPARATUS AND METHOD

CROSS-REFERENCE TO RELATED APPLICATIONS

The present application is a divisional of U.S. patent application Ser. No. 16/811,833, filed on Mar. 6, 2020.

BACKGROUND

Field of the Invention

The present invention relates to home security and, more particularly, to motion sensors used in security and home automation systems.

Description of Related Art

Home security systems are very popular in the United States and abroad. Such home security systems typically comprise a security panel and a number of sensors distributed around the home to detect unauthorized entry and/or movement inside the home. For example, a home may have all of its doors and windows monitored by installing a wireless door/window sensor onto each door and window of the home to detect unauthorized entry, and one or more motion sensors installed at one or more points inside the home for detecting unauthorized movement within the home. Each of the sensors may transmit a wireless signal to the security panel, where the security panel may take further action once a signal has been received from one of the sensors, such as to sound a siren inside the home or contact a remote monitoring facility.

Motion detectors may be susceptible to false alarms upon power-up, transmission of wireless signals or from interference emitted by certain internal components. Motion sensors typically comprise a pyroelectric infrared sensor that is sensitive to changes in voltage and current. During certain operating conditions, the voltage supplied to the pyroelectric infrared sensor may vary slightly, causing its output to indicate a false detection of motion.

In addition to the popularity of home security systems, home automation and control systems are now becoming widespread. Such systems allow users to monitor their home security systems, turn lights on and off remotely, lock and unlock doors remotely, as well as to better control home heating and air conditioning systems. In the latter category, home occupancy sensors are used to detect the presence of people inside homes to automatically control operation of heating and air conditioning systems, lights, etc.

Most motion and occupancy sensors are battery-powered, and occupancy sensors typically exhibit lower battery life than motion sensors, due to the fact that occupancy sensors transmit a signal every time occupancy is sensed. In contrast, motion sensors typically limit the number of transmissions by using a preset "dwell time", usually on the order of between three and four minutes, that restricts transmission to once per dwell time. Thus, the batteries in motion sensors tend to last longer than batteries in occupancy sensors. This problem is exacerbated when an occupancy sensor is placed in a high-traffic area, such as an entry hallway or kitchen, for example. While battery life is usually better for motion sensors, a tradeoff occurs between battery life and an accurate ability to know when a person is present or not.

Another difference between motion sensors and occupancy sensors is the transmission of a "restore" command by motion sensors. A restore command is used to inform a central communication device, such as a home security panel, a networked gateway or hub device, that it is permissible to arm a security system. Typically, a security system cannot be armed until all doors and windows are closed, and all motion sensors report no motion. However, if motion is detected, for example, when a user is about to leave his or her home, the "motion detected" event may be "latched" at the central communication device, appearing that a "fault" currently exists (i.e., "motion detected"), the user might have to wait until the motion sensor's dwell time expires to arm the security system. In order to avoid this undesirable situation, some motion sensors transmit the restore command immediately after the transmission of any "motion detected" signal, which allows a security system to be armed shortly after a "motion detected" signal is received by the central communication device. Occupancy sensors generally do not use a restore command.

Given that both motion sensors and occupancy sensors determine the presence of people and given the expense to purchase both types of sensors, it might be desirable to use a motion sensor as a dual-purpose sensor: a security motion sensor and an occupancy sensor. However, given the fact that most occupancy sensors do not utilize a dwell time and/or a restore command, using occupancy sensors as motion sensors is a non-starter.

It would be desirable, though, to combine traditional motion sensors with occupancy sensors to eliminate the need to purchase both types of sensors. It would also be desirable to fix the false detection problems noted above with respect to motion detectors.

SUMMARY

A person detection system, method and apparatus and method is described herein. In one embodiment, a person detection apparatus is described, comprising a sensor for detecting a presence of a person in an area, a memory for storing processor-executable instructions;

a transmitter for sending wireless signals, and a processor coupled to the detector, the memory and the transmitter, for executing the processor-executable instructions that causes the electronic person detector to detect an initial presence of a person in the area monitored by the electronic person detector, when the electronic person detector is in a security mode of operation, transmit, by the transmitter, a motion-sensed signal in response to detecting the initial presence of the person, transmit, by the transmitter, a restore command after transmission of the motion-sensed signal, the restore command instructing a security and home automation receiver hub to perform a first action related to a security system, and when the electronic person detector is in an occupancy mode of operation transmit, by the transmitter, an occupied signal in response to detecting the initial presence of the person, transmit, by the transmitter, an unoccupied signal after an occupancy dwell time has expired if the person is no longer in the area, the dwell time initiated after detection of the person, the unoccupied signal instructing the security and home automation receiver hub to perform a second action related to a home automation system.

In another embodiment, a method, performed by an electronic person detector for detecting a presence of a person in an area monitored by the electronic person detector, is described, comprising detecting an initial presence of a person in the area monitored by the electronic person detector, when the electronic person detector is in a security mode of operation, transmitting a motion-sensed signal in response to detecting the initial presence of the person, transmitting, by the transmitter, a restore command after transmission of the motion-sensed signal, the restore command instructing a security and home automation receiver hub to perform a first action related to a security system, and when the electronic person detector is in an occupancy mode of operation, transmitting, by the transmitter, an occupied signal in response to detecting the initial presence of the person, transmitting, by the transmitter, an unoccupied signal after an occupancy dwell time has expired if the person is no longer in the area, the dwell time initiated after detection of the person, the unoccupied signal instructing the security and home automation receiver hub to perform a second action related to a home automation system.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION

This disclosure describes an electronic person detector configured to act as either a security motion sensor, a home automation occupancy sensor, or both.

Figure 1:
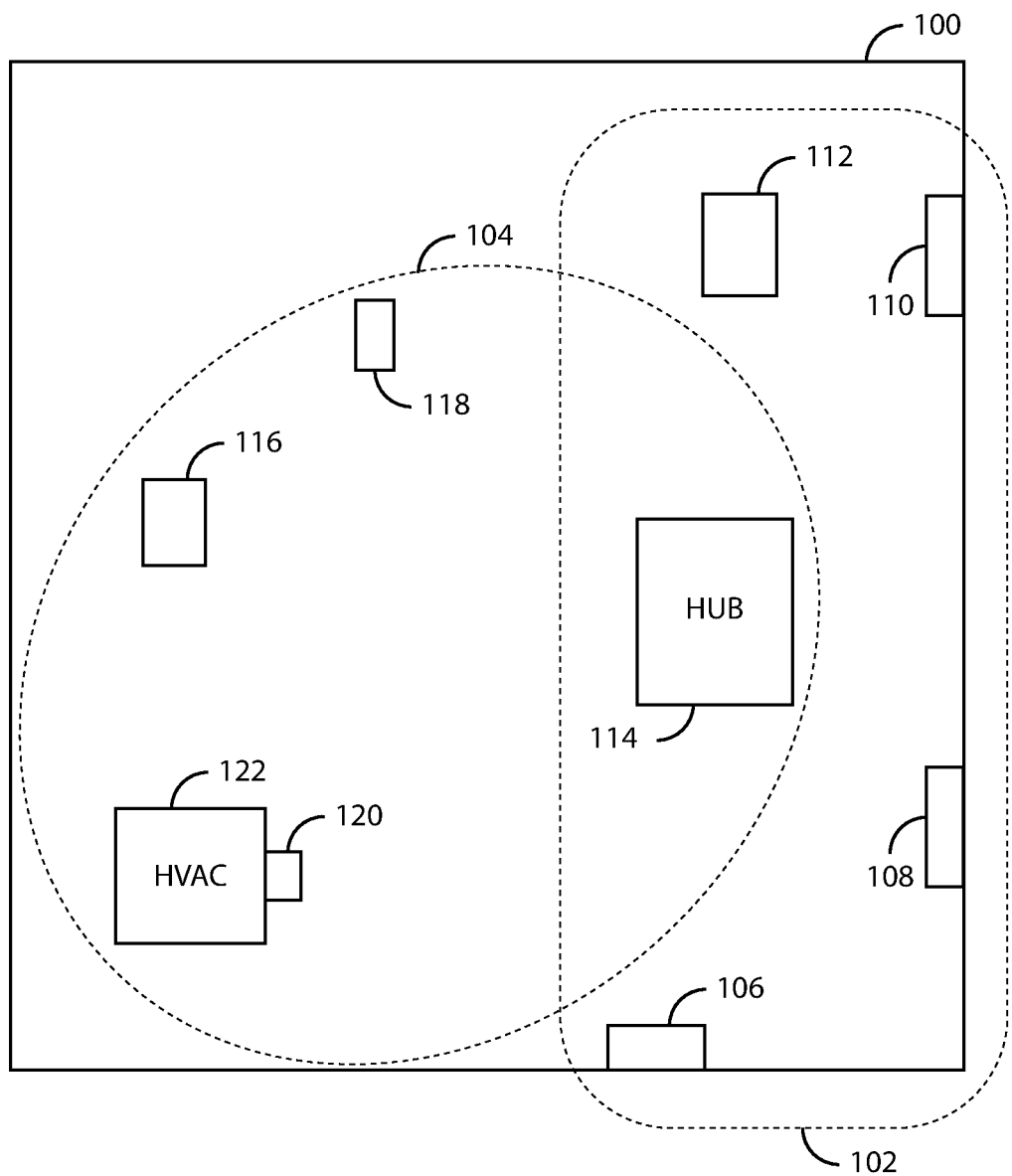
FIG. 1 illustrates a top, plan view of a home comprising a security system and a home automation system.

FIG. 1 illustrates a top, plan view of a home 100 comprising a security system 102 and a home automation system 104. In this particular example, security system 102 comprises three door/window sensors 106, 108 and 110, each for monitoring a door or a window of home 100, electronic person detector electronic person detector 112 and security and home automation hub 114. Home automation system, in this example, comprises two light control modules 116 and 118, an HVAC control module 120 that controls heating, ventilation and air conditioning (HVAC) unit 122, electronic person detector 112 and security and home automation hub 114. Electronic person detector 112 and security and home automation hub 114 are both common to security system 102 and to home automation system 104.

Each of the door/window sensors 106, 108 and 110 typically comprise a reed switch assembly, comprising a magnet, reed switch and a transmitter for wirelessly transmitting alarm signals to electronic person detector 112 when a door or window is opened or closed. Such sensors are well-known in the art.

Electronic person detector 112 is used to monitor an area inside or outside home 100 in proximity to electronic person detector 112, to detect movement and/or occupancy of one or more human beings within the area monitored by electronic person detector 112. Electronic person detector 112 may comprise a battery-powered motion sensor using passive infra-red (PIR) detection techniques, as known in the art, to detect infra-red heat as a person moves across the area. Electronic person detector 112 may, additionally or alternatively, comprise an occupancy sensor, used to determine the presence of one or more persons in the area using techniques such as ultrasonic, infra-red, thermal, or other well-known techniques to determine if a person is occupying the area. Unlike traditional motion (PIR) sensors, occupancy sensors generally do not require movement of a person in order to detect their presence. When either movement or the presence of a human being is detected, electronic person detector 112 transmits a wireless signal to security and home automation hub 114, indicative of such movement or presence, subject to a "dwell time". Electronic person detector 112 additionally transmits a "restore command" to security and home automation hub 114 when electronic person detector 112 is acting as a security motion detector, allowing security system 102 to be armed. In an occupancy sensor mode of operation, an "unoccupied" signal is sent to security and home automation hub 114 that informs security and home automation hub 114 that the area is no longer occupied. Security and home automation hub 114, in turn, may perform one or more actions relating to home automation system 104, such as to turn off one or more lights via one or more of the light control modules, to turn HVAC 122 on or off, etc. More details of the dwell time, the restore command and the unoccupied signal will be provided later herein.

Electronic person detector 112 may be configured remotely using a personal communication device (not shown), such as a fixed or mobile computing device, such as a laptop or desktop computer, or it may comprise a mobile phone, tablet computer, wearable device, or some other device capable of wireless communications with electronic person detector 112, either directly or indirectly via local-area network (not shown) and/or a wide-area network (not shown) (when the personal communication device is located outside of home 100 and out of range of the local-area network). The personal communication device executes a software application or "app" that allows a user to change a dwell time of electronic person detector 112 or to configure electronic person detector 112 as a security motion detector, a home automation occupancy sensor, or both, by sending wireless commands to electronic person detector 112, either directly or via a local-area network. In another embodiment, the personal communication device may send such commands to a remote server (not shown), which stores account information for thousands, or millions, of user accounts, each account associated with a particular security and home automation hub. In this embodiment, a user account may store information pertaining to electronic person detector 112, such as a dwell time, an operating mode (i.e., security sensor, occupancy sensor, or both). The online server may update electronic person detector 112 with a new operating mode or other information in response to receiving commands from the personal communication device. In another embodiment, electronic person detector 112 is configured using mechanical means, such as a jumper or a switch.

In a security motion sensor mode of operation, electronic person detector 112 detects movement of people in an area monitored by electronic person detector 112, using techniques well-known in the art. When movement is detected, electronic person detector 112 sends a "motion-sensed" signal to security and home automation hub 114. After the signal is sent, electronic person detector 112 does not transmit any further motion-detected signals until a security dwell time has expired (even though additional movement may be detected during the security dwell time). The security dwell time is stored in memory, and a timer is started within electronic person detector 112 after motion is detected, or an alarm signal transmitted. Electronic person detector 112 does not transmit any other alarm signals until the timer reaches the security dwell time. This prevents electronic person detector 112 from continuously transmitting alarm signals when ongoing motion is detected, thus saving battery life. The security dwell time is typically set to something on the order of several minutes, such as between one and 10 minutes. In one embodiment, the elapsed time from when motion was detected is reset each time that motion is detected.

In an occupancy mode of operation, electronic person detector 112 acts as an occupancy sensor, using well-known techniques to determine when an area monitored by electronic person detector 112 is occupied by one or more persons, using either the same circuitry/components as is used to detect motion or different circuitry/components. When occupancy of an area monitored by electronic person detector 112 is detected, electronic person detector 112 sends an "occupied" signal to security and home automation hub 114. In one embodiment, an "unoccupied" signal is sent to security and home automation hub 114, indicating that no one is in the area monitored by electronic person detector 112. The unoccupied signal is sent after an occupancy dwell time has expired. The occupancy dwell time limits the time between transmissions in order to maximize battery life, and is typically set to a range of between one and 30 seconds. A timer is started when either occupancy is detected or when person detector 112 transmits the occupied signal, and another occupancy is not transmitted until no occupancy has been determined for at least the elapsed time exceeds the occupancy dwell time, and, if no one is determined to be in the area monitored by electronic person detector 112 after the occupancy dwell time expires, the unoccupied signal is sent to security and home automation hub 114, indicating that no one is in the area. Security and home automation hub 114, in turn, performs one or more home automation related actions upon receipt of the unoccupied signal, such as turning lights off via the lighting control modules, turning off HVAC system 122 via HVAC control module 120, etc.

Security and home automation hub 114 comprises a central electronic point of monitoring and control for security system 102 and home automation system 104. While shown in FIG. 1 as being located within home 100, in other embodiments, security and home automation hub 114 may be located "in the cloud", i.e., its functionality performed by a remote server (not shown) accessible by a "gateway" device (not shown) in home 100 via one or more wide-area networks (not shown), such as the Internet. In the remaining disclosure, any reference to security and home automation hub 114 may include reference to such a "cloud-based" implementation.

Security and home automation hub 114 comprises circuitry to receive wireless signals from the security sensors 106, 108, 110 and electronic person detector 112, as well as to send signals to light control modules 116, 118 and to HVAC control module 120. In some embodiments, one or more of the security sensors may be configured to receive wireless signals transmitted from security and home automation hub 114, and/or the home automation control modules may be configured to transmit signals to security and home automation hub 114. Examples of devices similar to security and home automation hub 114 include Apple Inc.'s HomeKit® bridge and Samsung's SmartThings® hub.

Security and home automation hub 114 may be configured to operate in one of several different security modes of operation, such as "armed-away", "armed-home" or "off". In the armed-away mode of operation, security and home automation hub 114 performs one or more actions when it receives an alarm signal from one of the door/window sensors or electronic person detector 112 (i.e., a signal from the door/window sensors indicating that a door or window has been opened, or a "motion-sensed" signal from electronic person detector 112), such as causing a loud, local siren inside or outside of home 100 to sound, and/or contacting a remote monitoring facility (not shown) for further action. The armed-away mode may be activated when a person is leaving home 100 and no one else is inside, via a user interface of security and home automation hub 114 or by a personal communication device (not shown), such as a smart phone, wearable communication device, personal computer, or other similar devices.

The armed-home mode of operation operates similarly to the armed-away mode of operation, except that motion or occupied signals from electronic person detector 112 are ignored. The armed-home mode of operation is used when people are inside home 100 and desire protection against unauthorized intrusions via perimeter sensors such as door/window sensors 106, 108 and 110.

In the off mode of operation, security and home automation hub 114 ignores alarm signals from door/window sensors 106, 108, 110 and electronic person detector 112 for security purposes, but may continue to monitor these sensors for other types of signals from these sensors, such as heartbeat signals, low battery signals, inclusion or learn signals, etc. Additionally, alarm signals from the security sensors may be used for home automation purposes. For example, an alarm signal from door/window sensor 106, indicating that a window is open, may cause security and home automation hub 114 to send a command to HVAC module 120 for HVAC module 120 to turn HVAC system 122 off. Finally, while in the off mode of operation, home automation functionality is typically not affected.

Light control modules 116 and 118 are well-known electronic devices that allows one or more lights to be remotely controlled, while HVAC control module 120 controls HVAC system 122. In one embodiment, security and home automation hub 114 sends wireless signals to such modules to turn lights on or off, depending on whether an area monitored by electronic person detector 112 is occupied by one or more persons, or not. For example, when electronic person detector 112 alerts security and home automation hub 114 that a person is present in a room, security and home automation hub 114 may transmit one or more signals to light control module 116, 118, or both, instructing the light control module(s) to cause one or more lights in the room to turn on. When electronic person detector 112 determines that the room is no longer occupied, it may send an "unoccupied" signal to security and home automation hub 114, indicating that the room is now vacant. Security and home automation hub 114 may, in turn, transmit a wireless signal to the light control module(s) to turn respective lights off. HVAC system 122 may be controlled in a similar manner, i.e., when people are detected, HVAC system 122 is enabled and when people are not detected, HVAC system 122 is disabled or placed into a quiescent state.

Figure 2:
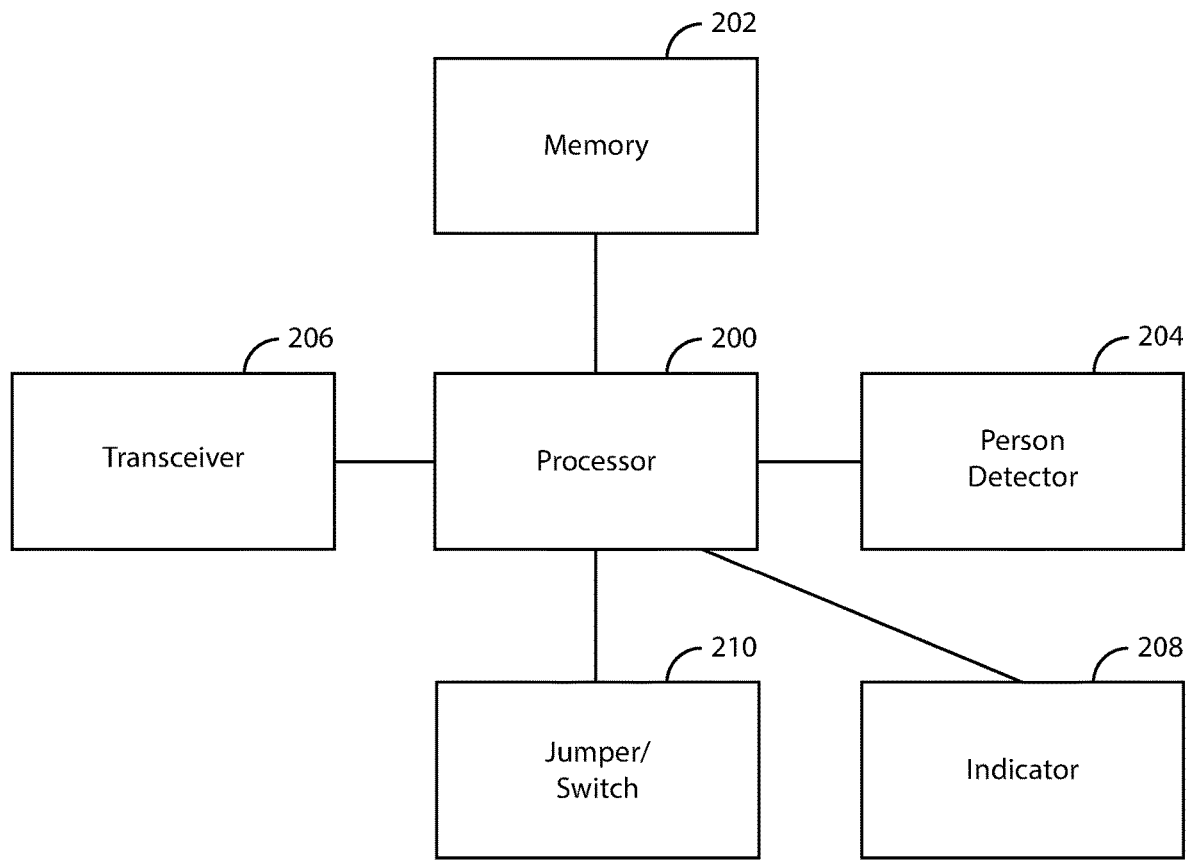
FIG. 2 is a functional block diagram of one embodiment of an electronic person detector used in conjunction with the security system and the home automation system as shown in FIG. 1.

FIG. 2 is a functional block diagram of one embodiment of electronic person detector 112. In this embodiment, electronic person detector 112 comprises a processor 200, a memory 202, a person sensor 204, a transceiver 206, an indicator 208 and an optional jumper/switch 210. In another embodiment, person sensor 204 comprises circuitry to detect movement and separate circuitry to detect occupancy. It should be understood that the functional blocks may be connected to one another in a variety of ways, that additional function blocks may be used (for example, amplification or filtering), and that not all functional blocks necessary for operation of electronic person detector 112 are shown for purposes of clarity, such as a power supply.

Processor 200 is configured to provide general operation of electronic person detector 112 by executing processor-executable instructions stored in memory 202, for example, executable code. Processor 200 typically comprises a general purpose processor, such as an ADuC7024 analog microcontroller manufactured by Analog Devices, Inc. of Norwood Mass., although any one of a variety of microprocessors, microcomputers, microcontrollers, and/or custom ASICs selected based on size, cost, power consumption, computing power, and/or other factors. In one embodiment, processor 200 comprises a Z-Wave 700 series processor, such as a ZGM130S SIP module, sometimes used in combination with a general purpose processor, in an embodiment that utilizes the Z-wave 700 protocol.

Memory 202 is coupled to processor 200 and comprises one or more non-transitory, information storage devices, such as RAM, ROM, flash memory, or virtually any other type of electronic, optical, or mechanical information storage device. Memory 202 is used to store the processor-executable instructions for operation of electronic person detector 112 as well as any information used by processor 200, such as one or more dwell times that defines how often electronic person detector 112 may transmit when motion and/or occupancy is detected. Memory 202 could, alternatively or in addition, be part of processor 200, as in the case of a microcontroller comprising on-board memory.

Person sensor 204 is coupled to processor 200 and comprises a sensor and related circuitry and, in some embodiments, firmware, to detect motion caused by a person in proximity to electronic person detector 112 and/or the presence (or absence) of a person in proximity to electronic person detector 112. Person sensor 204 may comprise one or more pyroelectric infrared sensors (for detecting motion of an infra-red emitting body), ultrasonic detectors (for detecting a doppler shift from a reflected body), heat or thermal detectors (for determining a temperature change), carbon dioxide sensors (for detecting the presence of carbon dioxide), microwave sensors (for detecting a doppler shift from a reflected body), a keycard detector (for determining when a hotel guest has inserted a hotel key card), and/or a camera (using firmware to detect a shape in the form of a person).

The pyroelectric infrared sensors used by many motion detectors may be sensitive to changes in its supply voltage and/or current. Such changes may occur as a result of a relatively high current draw from the battery during transmission of signals, such as transmission of heartbeat signals, battery low indicator signals, or other signals transmitted during the course of normal operation with security and home automation hub 114. A similar problem may be present upon initial power up of electronic person detector 112. Solutions to these problems are described later herein.

Transceiver 206 is coupled to processor 200 and comprises circuitry necessary to transmit and receive wireless signals from security and home automation hub 114 and/or, in some embodiments, a local-area network and/or a personal communication device. Transceiver 206 may further be configured to transmit and receive signals from other "nodes" in a mesh network, such as other security sensors or home automation control modules in security system 102 or home automation system 104. As used herein, any reference to transmissions between electronic person detector 112 and security and home automation hub 114 shall also include transmissions to and from other nodes in either security system 102 or home automation system 104 to relay signals between electronic person detector 112 and security and home automation hub 114. In any case, such circuitry to transmit and receive signals is well known in the art and may comprise BlueTooth, Wi-Fi, Z-wave, Zigbee, X-10, RF, optical, or ultrasonic circuitry, among others. In some embodiments, transceiver 206 is incorporated as part of processor 200.

Indicator 208 is coupled to processor 200 or, alternatively, transceiver 206, for providing a visual indication that a transmission has been, is or has just occurred. Electronic person detector 112 may transmit a number of different types of signals, including a "motion-sensed" signal, an "occupied" signal, an "unoccupied" signal, one or more restore signals, a battery low signal, initialization signals when electronic person detector 112 is initialized with security and home automation hub 114, data retransmissions from other sensors in a mesh network environment, as well as other signals. During transmission of at least some of these signals, processor 200 or transceiver 206 causes indicator 208 to illuminate, either for a predetermined time period or in some sort of modulated fashion, i.e., blinking a number of times.

Figure 3:
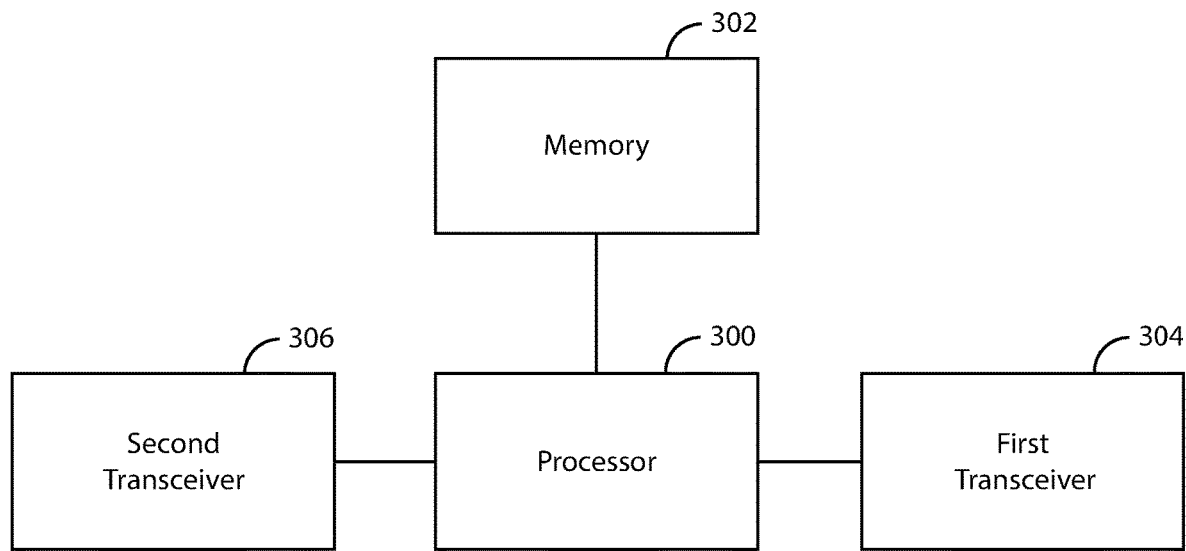
FIG. 3 is a functional block diagram of one embodiment of a security and home automation hub used in conjunction with the security system and the home automation system as shown in FIG. 1.

FIG. 3 is a functional block diagram of one embodiment of security and home automation hub 114. In this embodiment, security and home automation hub 114 comprises a processor 300, a memory 302, a first transceiver 304, and a second transceiver 306. It should be understood that the functional blocks may be connected to one another in a variety of ways, that additional function blocks may be used (for example, amplification or filtering), and that not all functional blocks necessary for operation of security and home automation hub 114 are shown for purposes of clarity, such as a power supply.

Processor 300 is configured to provide general operation of security and home automation hub 114 by executing processor-executable instructions stored in memory 302, for example, executable code. Processor 300 typically comprises a general purpose processor, such as a 1.2 GHz Quad-Core Cortex™-A7 processor designed by ARM holdings of Cambridge, England, although any one of a variety of microprocessors, microcomputers, microcontrollers, and/or custom ASICs may be used, selected based on size, cost, power consumption, computing power, and/or other factors.

Memory 302 is coupled to processor 300 and comprises one or more non-transitory, information storage devices, such as RAM, ROM, flash memory, or virtually any other type of electronic, optical, or mechanical information storage device. Memory 302 is used to store the processor-executable instructions for operation of security and home automation hub 114 as well as any information used by processor 300, such as a list of security sensors and control modules along with identification information of each sensor/control module, among other information. Memory 302 could, alternatively or in addition, be part of processor 300, as in the case of a microcontroller comprising on-board memory.

Transceiver 304 is coupled to processor 300 and comprises circuitry necessary to wirelessly communicate with the security sensors and the control modules. In some embodiments, more than one transceiver is used, each transceiver configured to communicate using a particular wireless communication protocol. Such circuitry is well known in the art and may comprise BlueTooth, Wi-Fi, Z-wave, Zigbee, X-10, RF, optical, or ultrasonic circuitry, among others.

Transceiver 306 is coupled to processor 300 and comprises circuitry necessary to wirelessly communicate with a local or wide area network, such as circuitry in accordance with any Wi-Fi or cellular data standard. Transceiver 306 is used to communicate with a remote server in embodiments where remote operation and setup of security and home automation hub 114, electronic person detector 112, or some other component of security system 102 or home automation system 104 is permissible using, for example, an app running on a smart phone.

Figure 4A:
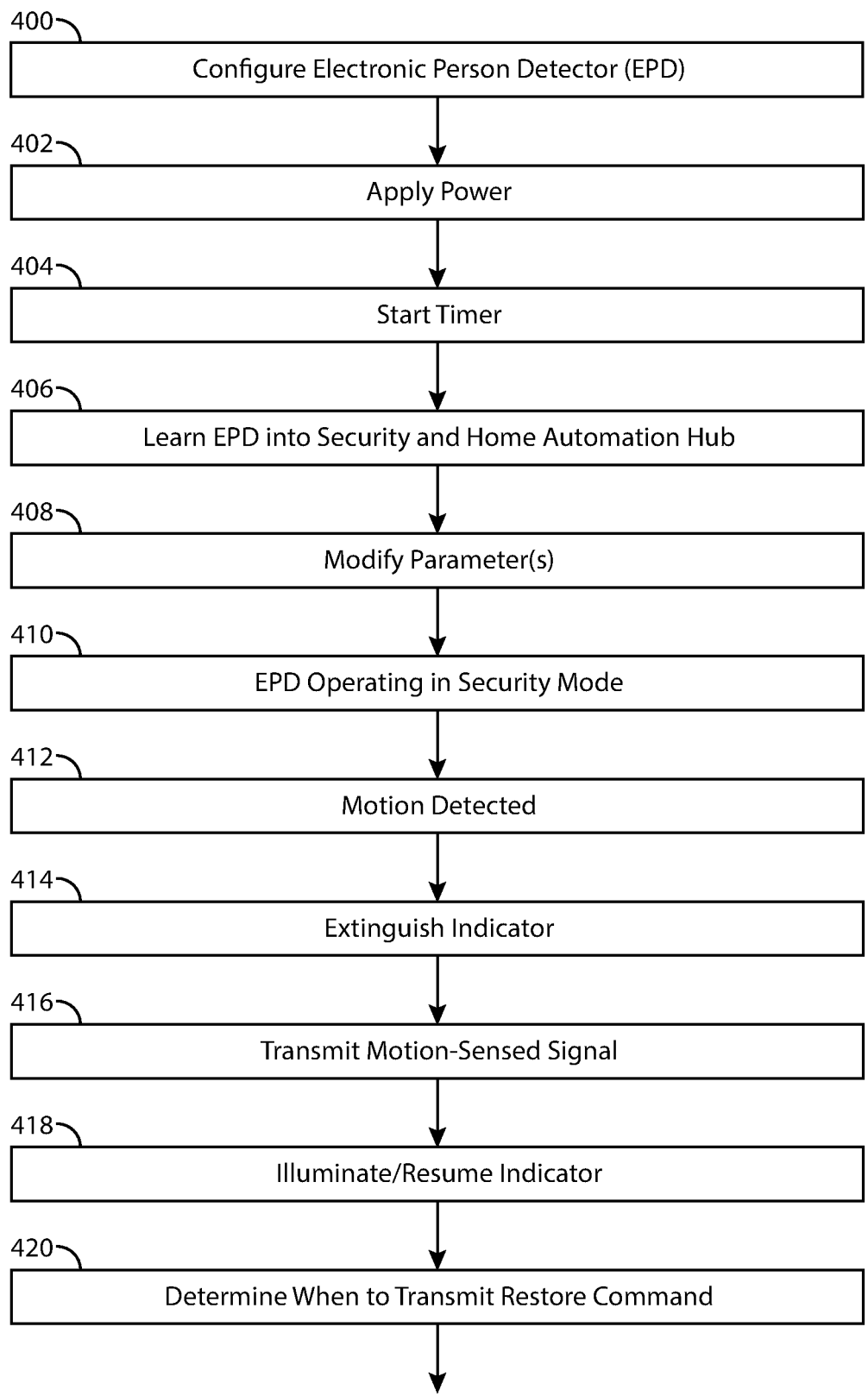
FIGS. 4A and 4B are a flow diagram illustrating one embodiment of a method for setup and operation of the electronic person detector as shown in FIG. 2.
Figure 4B:
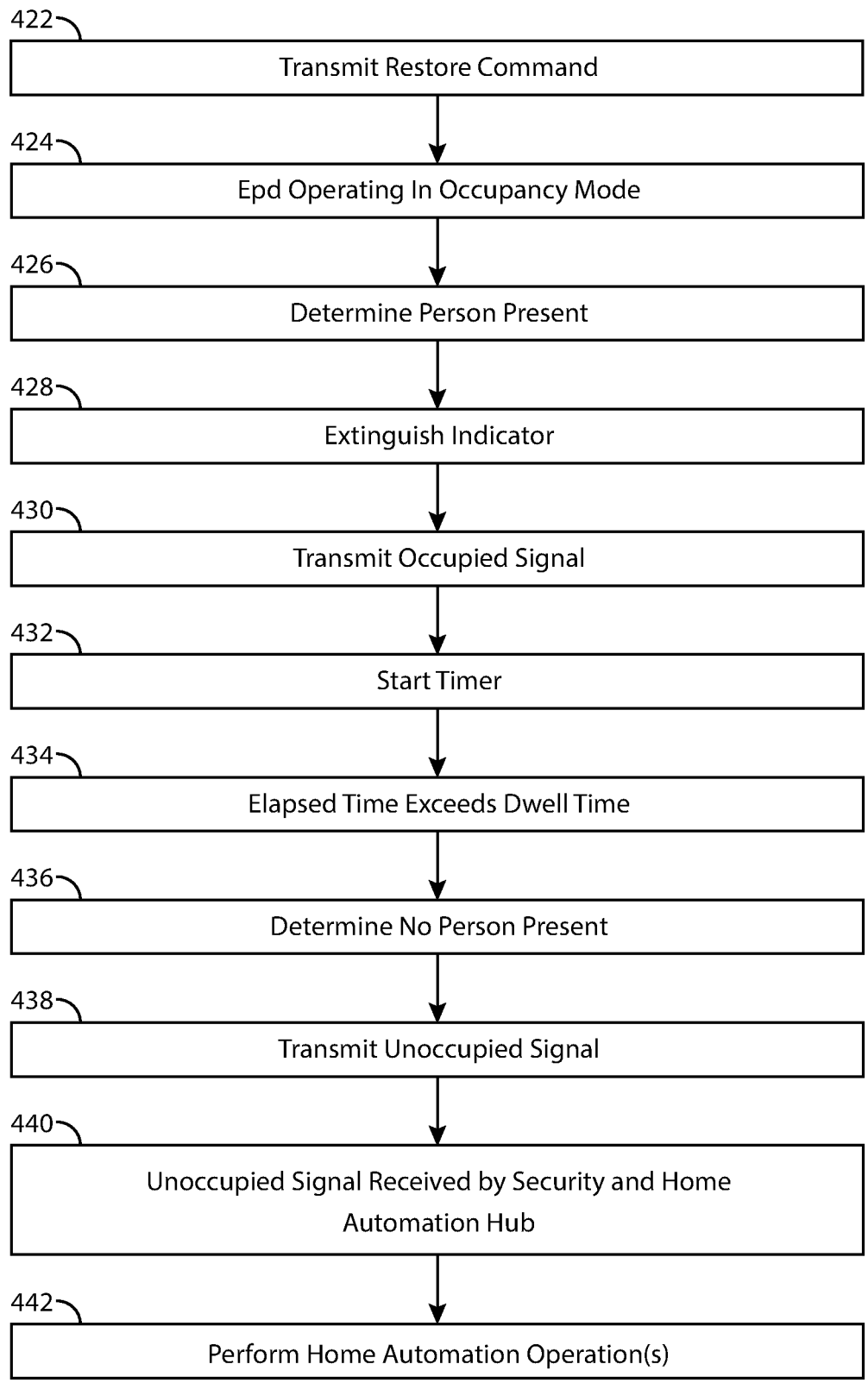

FIGS. 4A and 4B (collectively referred to hereinafter as FIG. 4) are a flow diagram illustrating one embodiment of method, or algorithm, performed by electronic person detector 112 and security and home automation hub 114, for setup and operation of electronic person detector 112. It should be understood that in some embodiments, not all of the steps shown in FIG. 4 are performed and that the order in which the steps are carried out may be different in other embodiments. It should be further understood that some minor method steps have been omitted for purposes of clarity.

The process begins at block 400, where a user configures electronic person detector 112 to operate in a security mode of operation, an occupancy mode of operation, or both. In the security mode of operation, electronic person detector 112 detects motion of a human being in proximity to electronic person detector 112 using person sensor 204 and notifies security and home automation hub 114 when motion has been detected, and security and home automation hub 114 processes the signal from electronic person detector 112, which causes security and home automation hub 114 to perform one or more security-related actions when security system 102 is in an armed-away mode of operation.

In the occupancy mode of operation, electronic person detector 112 acts as an occupancy sensor, sending "occupied" signals to security and home automation hub 114 when electronic person detector 112 detects that one or more people are in an area proximate to electronic person detector 112. The signals are received by security and home automation hub 114, and security and home automation hub 114 performs one or more home automation related actions upon receiving the signals, such as to cause one or more lights to turn on or off, control HVAC system 122, etc.

In the "both" mode of operation, i.e., operating as both a security sensor and an occupancy sensor, electronic person detector 112 transmits motion-sensed signals (when motion is determined), occupied signals (when occupancy is determined), as well as other signals, to security and home automation hub 114 and security and home automation hub 114 may cause one or more security-related actions to occur when a motion-sensed signal is received (i.e., sound an alarm, contact a remote monitoring facility, provide a notification to a user via smart phone, etc.) and may cause one or more home automation actions when an occupied signal is received (i.e., turn lights on/off, control HVAC system 122, provide a notification by smartphone, etc.). In one embodiment, person sensor 204 comprises two, different detectors, one to detect motion of a human being (such as a pyroelectric infrared sensor) and a different detector to detect occupancy (such as a thermal detector, IR sensor, etc.), and processor 200 processes signals from both detectors to separately determine motion and occupancy. In another embodiment, person sensor 204 comprises a single detector type, for example a thermal detector, that provides signals used by processor 200 to determine motion as well as occupancy.

In one embodiment, electronic person detector 112 is placed into a particular mode of operation using a "jumper", i.e., a connector, that electrically couples two points of circuitry inside electronic person detector 112 together, or a switch (jumper/switch 210). Processor 200 determines which mode of operation is intended by determining which circuit points have been coupled by the jumper/switch 210 upon application of power. In another embodiment, a user launches an application on a personal communication device to configure electronic person detector 112. The application may initiate a session with a remote server to access an account where information pertaining to electronic person detector 112 is stored, and any associated information such as an owner's name, address, phone number, account number, email address, etc. In other embodiments, the personal communication device communicates with electronic person detector 112 either directly (i.e., using Bluetooth or BLE), or indirectly (i.e., via a local-area network). In any case, electronic person detector 112 receives an instruction from the personal communication device to operate in a particular mode of operation. Processor 200 receives this instruction and causes electronic person detector 112 to operate in the mode indicated in the instruction.

At block 402, electronic person detector 112 is powered on. Typically, electronic person detector 112 comprises a battery having a rated voltage of 3.3 volts.

At block 404, upon receiving power, processor 200 begins a timer that is used to determine an elapsed time from when power was applied to electronic person detector 112. Prior to the timer reaching a predetermined time period, such as 500 ms—one second or more, processor 200 ignores signals from person sensor 204. During the predetermined time period, person sensor 204 may send erroneous signals to processor 200, due to variations in voltage and current as each component of electronic person detector 112 is energized when power is turned on. The erroneous signals may be interpreted by processor 200 as an indication of a person moving in proximity to electronic person detector 112. Ignoring the signal from person sensor 204 avoids transmission of a false "motion-sensed" signal. "Ignoring" may mean processor 200 not processing the signals from person sensor 204, changing one or more threshold values used to detect movement to values that do not trigger a determination that movement has been detected, or disabling transceiver 206.

In another embodiment, a current draw and/or supply voltage drop to one or more components is monitored by processor 200 using techniques well known in the art to determine when to begin monitoring/processing signals from person sensor 204. The current draw/voltage drop may comprise a current flowing from the battery or a current flowing though one or more other components of electronic person detector 112, or a supply voltage provided to one or more components. When the current and/or voltage has stabilized, i.e., has not changed more than a predetermined amount within a predetermined time period, such as 1 milliamp in a two second time period, or 20 millivolts over a three second time period, processor 200 begins monitoring/processing signals from person sensor 204. In another embodiment, the current/voltage is considered stable when the current draw drop is less than a predetermined amount, such as a quiescent current draw, i.e., a current draw when electronic person detector 112 is powered on but not transmitting.

In another embodiment, processor 200 monitors the output of person sensor 204 and begins processing signals from person sensor 204 when the output of person sensor 204 is stable, i.e., less than a predetermined voltage limit stored in memory 202. In the case where person sensor 204 is a pyroelectric infrared sensor, the predetermined voltage limit may be 10 millivolts. In a related embodiment, the output is determined to be stable by processor 200 when a difference/delta between two consecutive samples (slope/derivative) of the output of person detector 204 is less than a natural rise and fall time of person detector 204, e.i. 10 mv each sample for, for example, 5 seconds.

In yet another embodiment, processor 200 begins monitoring/processing signals from person sensor 204 using a combination of the above, i.e., when a timer expires after power up, when a current draw is stable, and/or when an output of person sensor 204 is stable.

Once processor 200 determines that one or more criteria, above, has been achieved, processor 200 begins monitoring person sensor 204 to determine whether movement and/or occupancy has been detected, and responds accordingly when motion, occupancy, or both, are detected.

At block 406, electronic person detector 112 is "learned" or "included" into security and home automation hub 114, using techniques well known in the art. During the learn process, processor 200 may transmit a first identification code stored in memory 202 (such as a first serial number or other alpha-numeric string) when electronic person detector 112 is operating in the security mode of operation, transmit a second identification code stored in memory 202 (such as a second serial number or other alpha-numeric string) when electronic person detector 112 is operating in the occupancy mode of operation, or transmit a third identification code stored in memory 202 (such as a third serial number or other alpha-numeric string) when electronic person detector 112 is operating in both the security mode of operation and the occupancy mode of operation. Each of the identification codes provides an indication to security and home automation hub electronic person detector 112 of an operating mode of electronic person detector 112, so that security and home automation hub 114 may processes signals received from electronic person detector 112 accordingly.

At block 408, processor 200 may modify one or more parameters stored in memory 202 based on whether electronic person detector 112 is in the security mode of operation or the occupancy mode of operation. When electronic person detector 112 is in the security mode of operation, processor 200 may modify a dwell time and a restore time stored in memory 202.

In the security mode of operation, the dwell time is a predetermined time period during which electronic person detector 112 does not transmit a "motion-sensed" signal, even when processor 200 determines that motion is present. In the security mode of operation, processor 200 may set the dwell time on the order of several minutes, such as between about one and five minutes. By setting the dwell time to a value on the order of several minutes, electronic person detector 112 will not waste precious battery life transmitting multiple "motion-sensed" signals after first detecting motion in the area proximate to electronic person detector 112.

In the occupancy mode of operation, the dwell time is a predetermined time period after determining occupancy, or upon transmission of an occupied signal, during which electronic person detector 112 does not transmit another occupied signal, even when processor 200 determines that a person is still present. In the occupancy mode of operation, processor 200 may set the dwell time to a value on the order of seconds, such as between about one second and thirty seconds, typically less than the dwell time when electronic person detector 112 is in the security mode of operation. By setting the dwell time to about between one and thirty seconds, electronic person detector 112 will not waste precious battery life transmitting multiple occupied signals after first detecting motion in the area proximate to electronic person detector 112.

In the security mode of operation, processor 200 transmits a restore command after a determination of motion or a transmission of a "motion-sensed" signal. In the security mode of operation, the restore command "clears" a fault condition that exists at security and home automation hub 114, allowing security system 102 to be armed. Typically, in most security systems, all faults must be cleared from the system before it can be armed. This means that all monitored doors and windows must be closed, and that motion is not sensed in any area monitored by any motion detectors. When electronic person detector 112 detects motion, the "motion-sensed" signal received by security and home automation hub 114 creates a fault condition related to electronic person detector 112 and unless cleared, security system 102 cannot be armed. Thus, transmitting the restore command soon after transmitting the "motion-sensed" command allows security system 102 to be armed in a situation where the area being monitored near an entry/exit door. In the security mode of operation, processor 200 typically transmits the restore command within a few seconds after transmission of a "motion-sensed" signal, such as between about zero and five seconds.

In the occupancy mode of operation, electronic person detector 112 transmits an "unoccupied" signal after expiration of the dwell time if no one is determined to be in the area monitored by electronic person detector 112. The unoccupied signal informs security and home automation hub 114 that no one is present in the area and, in response, security and home automation hub 114 may perform one or more actions, such as to turn off one or more lights, turn off HVAC system 122, etc. In the occupancy mode of operation, processor 200 transmits the unoccupied signal after no occupancy has been determined for an occupancy dwell time of between about one to thirty seconds.

At block 410, electronic person detector 112 is operating in the security mode of operation when jumper/switch 210 is configured for electronic person detector 112 to operate in the security mode.

At block 412, processor 200 detects motion in the area monitored by electronic person detector 112, using signals provided by person sensor 204, as is known in the art.

At block 414, in response to detecting motion, processor 200 causes indicator 208 to stay, or become, extinguished. Illumination of indicator 208 may occur during transmissions from electronic person detector 112 to alert persons nearby of one or more events or status, such as transmissions of motion-sensed signals, transmissions of heartbeat signals, transmissions of low battery signals, indications of status, such as during the learn process described at block 406, processor 200 may cause indicator 208 to flash several times to indicate successful or unsuccessful inclusion into security and home automation hub 114. However, illumination of indicator 208 may cause interference when transmitting signals, because some indicators 208 may require a relatively high forward voltage in order to become illuminated. Typically, the relatively high voltage is provided by a voltage regulator that can generate radio-frequency signals that interfere with the wireless signals transmitted by transceiver 206.

In one embodiment, where processor 200 causes signals to be transmitted by transceiver 206, processor 200 extinguishes indicator 208, if it is illuminated, just before transmission of any signals, and then re-illuminates indicator 208 after transmission has occurred.

Figure 5:
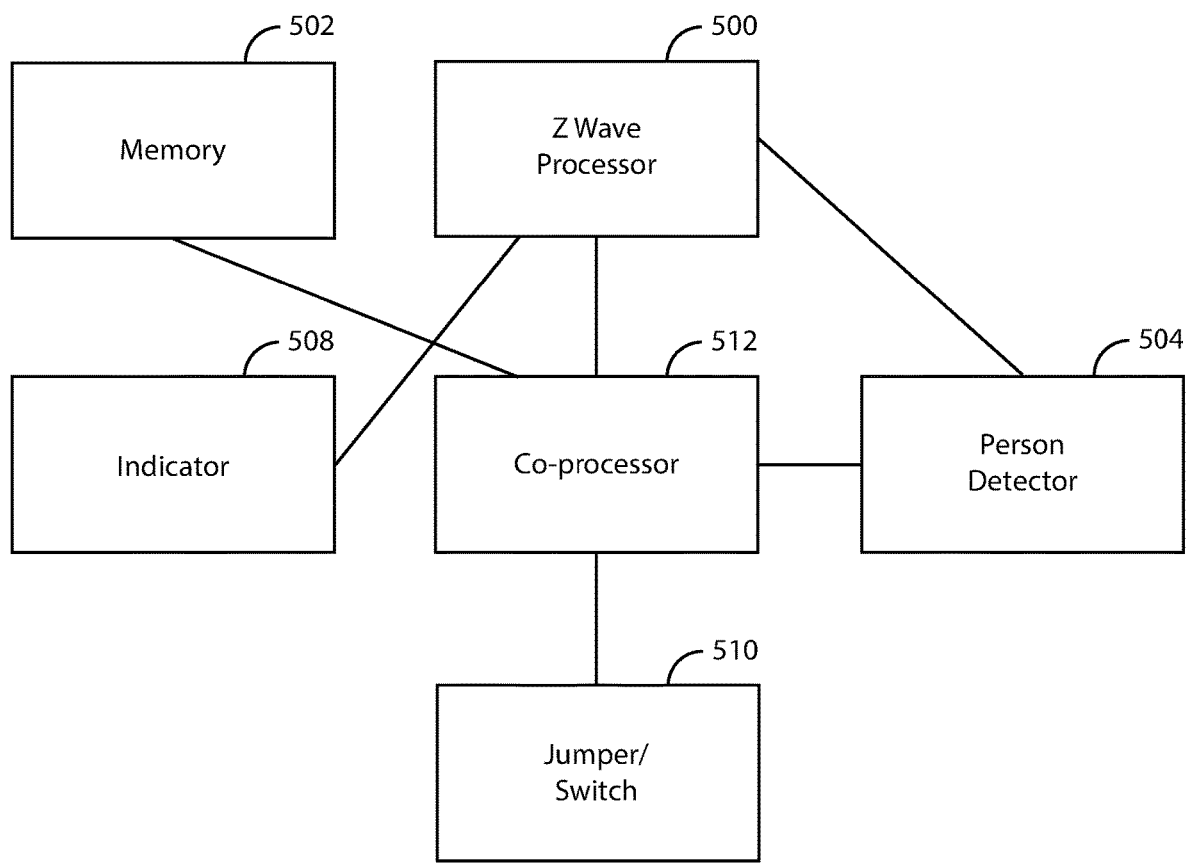
FIG. 5 is a functional block diagram of another embodiment of an electronic person detector used in conjunction with the security system and the home automation system as shown in FIG. 1.

In another embodiment, electronic person detector 112 comprises a Zwave module, such as a ZGM130S Z-Wave 700 SiP Module manufactured by Silicon Labs of Austin, Texas, that combines the functionality of transceiver 206 with at least some of the functionality of processor 200. A functional block diagram of this embodiment is shown in FIG. 5. FIG. 5 illustrates this embodiment of electronic person detector 112, comprising Zwave module 500, memory 502, person detector 504, indicator 508, optional jumper/switch 510 and co-processor 512. Memory 502, person detector 504, indicator 508, optional jumper/switch 510 comprise the same or similar functionality as memory 202, person sensor 204, indicator 208, and optional jumper/switch 210 as shown in FIG. 2, respectively. Zwave module 200 comprises a microcontroller unit (MCU) and an integrated RF transceiver. In order to preserve battery life, Zwave module 500 is typically kept in a quiescent state until "awakened" by co-processor 512. Co-processor 512 comprises a low cost, low-power microprocessor or microcontroller (such as one of a family of microcontrollers made by Microchip Technology of Chandler, Arizona) which may execute processor-executable instructions stored in memory 502, or stored within a memory of co-processor 512, to perform certain functions, such as to monitor signals from person detector 504, and to awake Zwave module 500 when co-processor 512 determines movement (or occupancy when in an occupancy mode of operation). Co-processor 512 may also control illumination of indicator 508 in accordance with commands sent to co-processor 512 from Zwave module 500 (i.e., illuminate, extinguish, blink, etc.). In this embodiment, Zwave module 500 sends a command to extinguish, or keep extinguished, indicator 508 while Zwave module 500 transmits signals to security and home automation hub 114. When transmission has been completed, Zwave module 500 may send co-processor 512 a signal to resume the state of indicator 508 just prior to transmission, or it may send co-processor 512 a signal to illuminate indicator 508 for a predetermined time period, such as 1 second, in order to inform nearby persons that electronic person detector 112 just transmitted a signal.

At block 416, while indicator 208 is extinguished, processor 200 causes a "motion-sensed" signal to be transmitted by transceiver 206 to security and home automation hub 114.

At block 418, processor 200 causes indicator 208 to illuminate (i.e., continuously, blinking, for a predetermined time period etc.) or to resume its state (illuminated or not) just prior to processor 200 determining that motion had occurred.

At block 420, after the motion-sensed signal has been transmitted, processor 200 determines when to transmit the restore command. Processor 200 determines that electronic person detector 204 is operating in a security mode of operation, either by checking jumper/switch 210, or by checking a flag that may have been set upon power-up, indicating whether electronic person detector 112 is operating in the security mode of operation, the occupancy mode of operation, or both.

At block 422, after determining that electronic person detector 112 is operating in the security mode of operation, processor 200 transmits the restore command "immediately" after transmitting the motion-sensed signal. "Immediately" means from about zero to five seconds. Security and home automation hub 114 receives the restore command and, in response, clears a fault associated with electronic person detector 112, as is known in the art.

At block 424, electronic person detector 112 is operating in an occupancy mode of operation when jumper/switch 210 is configured for electronic person detector 112 to operate in the occupancy mode.

At block 426, processor 200 determines that a person is present in the area monitored by electronic person detector 112 using techniques well-known in the art.

At block 428, processor 200 causes indicator 208 to stay, or become, extinguished, as explained above.

At block 430, processor 200 causes transceiver 206 to transmit an occupied signal, indicating that electronic person detector 112 detected a person present in the area monitored by electronic person detector 112.

At block, 432, processor 200 starts a timer to determine an elapsed time from when occupancy was detected, or from when the occupied signal was transmitted.

At block 434, processor 200 determines that the elapsed time has met or exceeded a predetermined occupancy dwell time stored in memory 202.

At block 436, processor 200 determines that no other determinations of occupancy had been detected during the predetermined occupancy dwell time.

At block 438, in response to determining that no other determinations of occupancy had been detected during the predetermined occupancy dwell time, processor 200 causes transceiver 206 to transmit an unoccupied signal. Processor 200 may extinguish and/or cause indicator 208 to become or remain extinguished during transmission, as described above.

At block 440, the unoccupied signal is received by security and home automation hub 114.

At block 442, in response to receiving the unoccupied signal, processor 300 performs one or more home automation operations, such as to transmit a signal to one or more of the light control modules 114 and/or 116 instructing the light control module(s) to turn off one or more lights, send a signal to HVAC control module 120 instructing HVAC control module 120 to shut off or otherwise change an operating characteristic of HVAC system 122, or some other operation related to home automation and/or control.

Figure 6A:
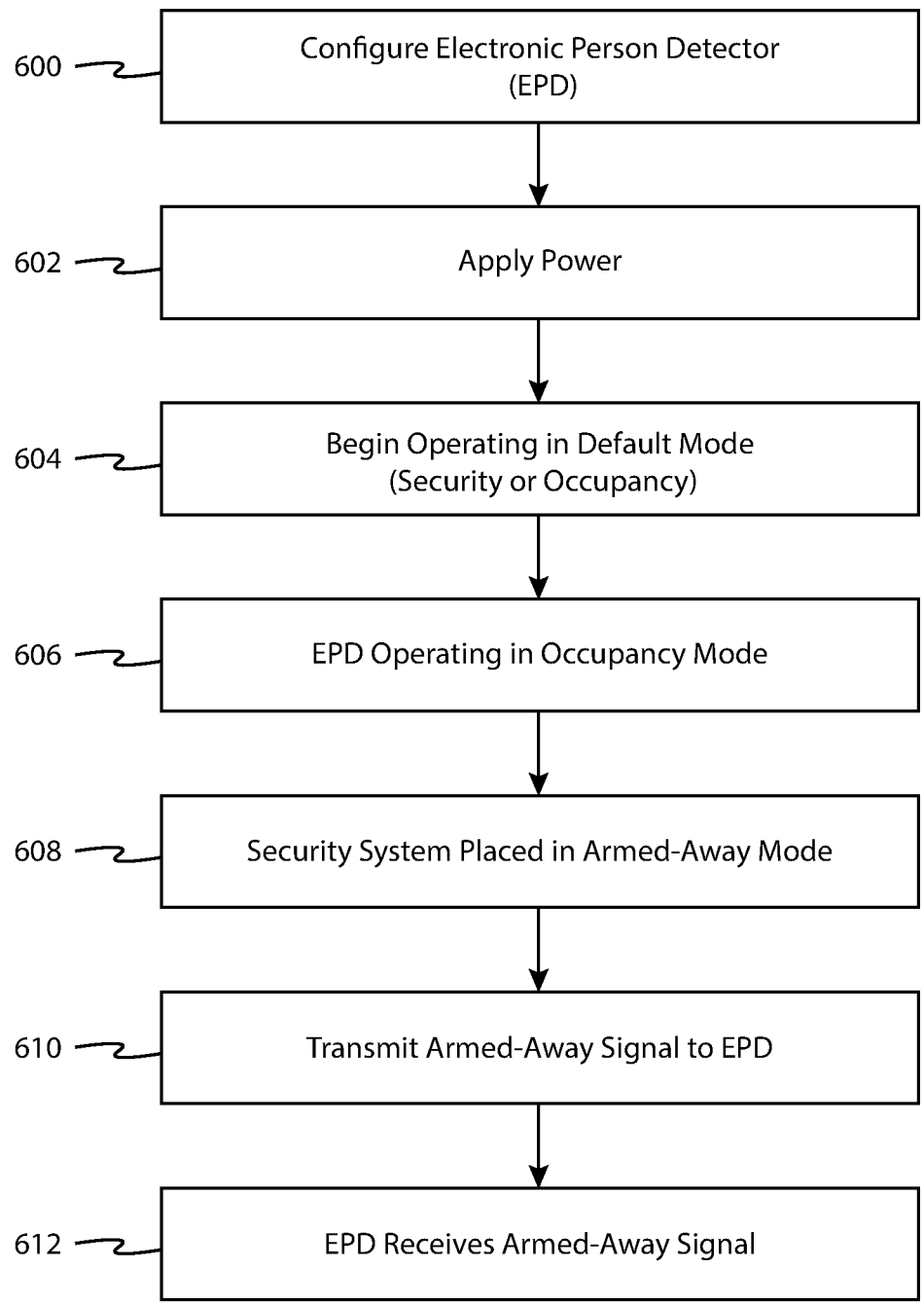
FIGS. 6A and 6B is a flow diagram illustrating one embodiment of a method for setup and operation of the electronic person detector as shown in FIG. 2 when the electronic person detector is set to act both as a security motion detector and a home automation occupancy sensor.
Figure 6B:
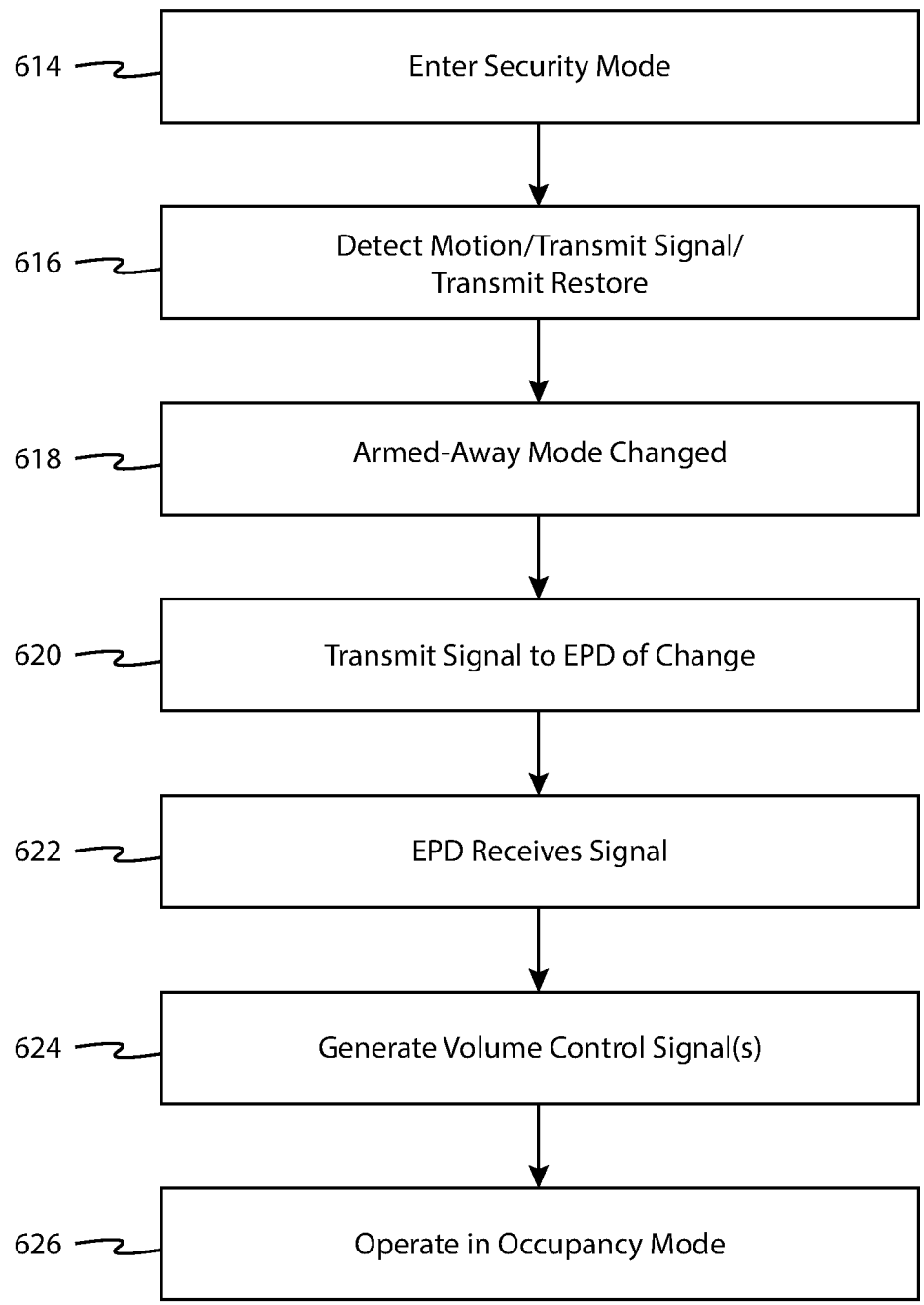

FIGS. 6A and 6B (collectively referred to hereinafter as FIG. 6) are a flow diagram illustrating one embodiment of method, or algorithm, performed by electronic person detector 112 and security and home automation hub 114, for setup and operation of electronic person detector 112 when electronic person detector 112 is set to act both as a security motion detector and a home automation occupancy sensor. It should be understood that in some embodiments, not all of the steps shown in FIG. 6 are performed and that the order in which the steps are carried out may be different in other embodiments. It should be further understood that some minor method steps have been omitted for purposes of clarity.

The process begins at block 600, where a user configures electronic person detector 112 to operate in the "both" mode of operation, i.e., as a security motion detector and a home automation occupancy sensor.

In the "both" mode of operation, i.e., operating as both a security sensor and an occupancy sensor, electronic person detector 112 transmits both motion-sensed signals (when motion is determined) and occupied signals (when occupancy is determined) to security and home automation hub 114, as well as other signals, and security and home automation hub 114 may cause one or more security-related actions to occur when a motion-sensed signal is received (i.e., sound an alarm, contact a remote monitoring facility, provide a notification to a user via smart phone, etc.) and may cause one or more home automation actions when an occupied signal is received (i.e., turn lights on/off, control HVAC system 122, provide a notification by smartphone, etc.). In one embodiment, person sensor 204 comprises two, different detectors, one to detect motion of a human being (such as a pyroelectric infrared sensor) and a different detector to detect occupancy (such as a thermal detector, IR sensor, etc.), and processor 200 processes signals from both detectors to separately determine motion and occupancy. In another embodiment, person sensor 204 comprises a single detector type, for example a thermal detector, that provides signals used by processor 200 to determine motion as well as occupancy.

In one embodiment, electronic person detector 112 is placed into the "both" mode of operation using a "jumper", as explained previously. In another embodiment, a user launches an application on a personal communication device to configure electronic person detector 112, also explained previously.

At block 602, electronic person detector 112 is powered on. Typically, electronic person detector 112 comprises a battery having a rated voltage of 3.3 volts.

At block 604, upon receiving power, processor 200 begins operating in either the security mode of operation or the occupancy mode of operation, depending on a default instruction in the processor-executable instructions stored in memory 202. As an example, the method will be described as electronic person detector 112 operating in the occupancy mode of operation.

At block 606, electronic person detector 112 operates in the occupancy mode of operation similar to the operations described in the method of FIG. 4, blocks 424-434, transmitting an occupied signal to security and home automation hub 114 when occupancy has been determined, and transmitting an unoccupied signal to security and home automation hub 114 when no occupancy has been detected during the home automation dwell time.

At block 608, a user places security system 102 into an armed-away mode of operation using user interface of security and home automation hub 114, or by using an app executed on a personal communication device, such as a smart phone.

At block 610, in response to being placed into the armed-away mode of operation, security and home automation hub 114 transmits a signal to electronic person detector 112, indicating that security system 102 has been placed into the armed-away mode of operation.

At block 612, electronic person detector 112 receives the signal from security and home automation hub 114 via transceiver 206.

At block 614, in response to receiving the signal, processor 200 places electronic person detector 112 into the security mode of operation by monitoring person sensor 204 for movement of a person in proximity to electronic person detector 112, rather than occupancy.

At block 616, when movement is detected by processor 200, processor 200 transmits the motion-sensed signal, as described previously, following "immediately" by a restore command, also described previously.

At block 618, at some time later when the user arrives back at home 100, the user changes the armed-away mode of security system 102 to either into an "off" state or to the armed-home mode of operation.

At block 620, in response to placing security system 102 into either the off state or the armed-home state, security and home automation hub 114 transmits a signal to electronic person detector 112, indicating that security system 102 has been placed into a "disabled" state of either off or the armed-home mode of operation.

At block 622, electronic person detector 112 receives the signal from security and home automation hub 114 via transceiver 206.

At block 624, in response to receiving the signal, processor 200 places electronic person detector 112 back into the occupancy mode of operation by monitoring person sensor 204 for occupancy of a person in proximity to electronic person detector 112, rather than movement.

At block 626, processor 200 operates in the occupancy mode, transmitting an occupied signal to security and home automation hub 114 when occupancy is detected and an unoccupied signal when no occupancy is detected for a period equal to or greater than the occupancy dwell time.

Therefore, having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

What is claimed is:

1. An electronic person detector for monitoring an area for motion and occupancy, comprising:
   a sensor;
   a memory for storing processor-executable instructions;
   a transceiver for sending and receiving wireless signals; and
   a processer coupled to the sensor, the memory and the transceiver, for executing the processor-executable instructions that causes the electronic person detector to:
   operate, by the processor, the electronic person detector in a first mode of operation in which the processor determines, via use of signals received from the sensor, an occurrence of motion caused by a person in the area;
   receive, by the processor via the transceiver, a first signal from a local hub indicative of a change in an operating mode of a security system; and
   in response to receiving the first signal, cause, by the processor, the electronic person detector to operate in a second mode of operation in which the processor determines, via use of signals received from the sensor, an occupancy of the area by a person instead of using the signals to determine the occurrence of motion caused by a person in the area.

2. The electronic person detector of claim 1, wherein the processor-executable instructions that cause the electronic person detector to operate in the first mode of operation comprises instructions that causes the electronic person detector to:

transmit, by the processor via the transceiver, a motion-sensed signal in response to detecting motion caused by a person in the area.

3. The electronic person detector of claim 1, wherein the processor-executable instructions that cause the electronic person detector to operate in the second mode of operation comprises instructions that causes the electronic person detector to:

transmit, by the transceiver, an occupied signal in response to detecting that the area is occupied by a person.

4. The electronic person detector of claim 1, wherein the first signal comprises an indication that the security system is operating in an armed-away mode.

5. The electronic person detector of claim 1, wherein the first signal comprises an indication that the security system is operating in an armed-home mode.

6. The electronic person detector of claim 1, wherein the memory further stores a first dwell time and a second dwell time, each dwell time defining a rolling time window during which the electronic person device does not transmit either a motion detected signal or an occupied signal, respectively, wherein the electronic person detector further comprises processor-executable instructions that cause the electronic person detector to:

while operating in the second mode of operation, transmit, by the processor via the transceiver, an occupied signal in response to detecting that the area is occupied by a person only after the second dwell time has elapsed from a previous detection of occupancy in the area.

7. The electronic person detector of claim 6, comprising further processor-executable instructions that cause the electronic person detector to:

receive, by the processor via the transceiver, a second signal from the local hub indicative of another change in the operating mode of the security system;

in response to receiving the second signal, cause, by the processor, the electronic person detector to operate in the first mode of operation; and while operating in the first mode of operation, transmit, by the processor via the transceiver, a motion detected signal in response to detecting movement in the area only after the first dwell time has elapsed from a previous detection of motion in the area.

8. A method, performed by an electronic person detector in an area, comprising:

operating, by a processor, the electronic person detector in a first mode of operation in which the processor determines, via use of signals received from a sensor, an occurrence of a motion caused by a person in the area;

receiving, by the processor via a transceiver coupled to the processor, a first signal from a local hub indicative of a change in an operating mode of a security system;

in response to receiving the first signal, causing, by the processor, the electronic person detector to operate in a second mode of operation in which the processor determines, via use of signals received from the sensor, an occupancy of the area by a person instead of using the signals to determine the occurrence of motion caused by a person in the area.

9. The method of claim 7, wherein operating in the first mode of operation comprises:

transmitting, by the processor via the transceiver, a motion-sensed signal in response to detecting motion caused by a person in the area.

10. The method of claim 7, wherein operating in the second mode of operation comprises:

transmitting, by the transceiver, an occupied signal in response to detecting that the area is occupied by a person.

11. The method of claim 7, wherein the first signal comprises an indication that the security system is operating in an armed-away mode.

12. The method of claim 7, wherein the first signal comprises an indication that the security system is operating in an armed-home mode.

13. The method of claim 7, wherein a memory coupled to the processor further stores a first dwell time and a second dwell time, each dwell time defining a rolling time window during which the electronic person device does not transmit either a motion detected signal or an occupied signal, respectively, further comprising:

while operating in the second mode of operation, transmitting, by the processor via the transceiver, an occupied signal in response to detecting that the area is occupied by a person only after the second dwell time has elapsed from a previous detection of occupancy in the area.

14. The method of claim 13, further comprising:

receiving, by the processor via the transceiver, a second signal from the local hub indicative of another change in the operating mode of the security system;

in response to receiving the second signal, causing, by the processor, the electronic person detector to operate in the first mode of operation; and while operating in the first mode of operation, transmitting, by the processor via the transceiver, a motion detected signal in response to detecting movement in the area only after the first dwell time has elapsed from a previous detection of motion in the area.

* * * * *